(12) United States Patent
Furudate et al.

(10) Patent No.: US 8,971,460 B2
(45) Date of Patent: Mar. 3, 2015

(54) WIRELESS RECEIVING APPARATUS

(71) Applicant: Fujitsu Limited, Kawasaki-shi, Kanagawa (JP)

(72) Inventors: Hideki Furudate, Ota (JP); Takanori Iwamatsu, Nasushiobara (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/134,780

(22) Filed: Dec. 19, 2013

(65) Prior Publication Data

US 2014/0105335 A1    Apr. 17, 2014

Related U.S. Application Data

(63) Continuation of application No. PCT/JP2011/065713, filed on Jul. 8, 2011.

(51) Int. Cl.
*H04L 27/06* (2006.01)
*H04B 7/08* (2006.01)
*H04B 1/10* (2006.01)

(52) U.S. Cl.
CPC .............. *H04B 7/08* (2013.01); *H04B 7/0845* (2013.01); *H04B 1/1027* (2013.01)
USPC ........ 375/343; 375/148; 375/346; 455/278.1; 455/501

(58) Field of Classification Search
None
See application file for complete search history.

(56) References Cited

U.S. PATENT DOCUMENTS

2004/0042569 A1*  3/2004  Casabona et al. ............. 375/346
2009/0219977 A1*  9/2009  Iwamatsu ..................... 375/148

FOREIGN PATENT DOCUMENTS

| JP | 3-139031 | 6/1991 |
| JP | 7-245519 | 9/1995 |
| JP | 7-321681 | 12/1995 |
| JP | 9-148837 | 6/1997 |
| JP | 2009-212590 | 9/2009 |

OTHER PUBLICATIONS

International Search Report, mailed in connection with PCT/JP2011/065713 and mailed Aug. 9, 2011.

* cited by examiner

*Primary Examiner* — Adolf Dsouza
(74) *Attorney, Agent, or Firm* — Fujitsu Patent Center (57) ABSTRACT

A wireless receiving apparatus includes a spurious component extraction unit, and a spurious cancellation unit. The spurious component extraction unit is configured to cancel a desired wave with a multi-antenna configuration, and extract spurious components. The spurious cancellation unit is configured to cancel spurious in received signals by using the spurious components extracted. A first correlation unit in the spurious component extraction unit finds a correlation between an output of the spurious extraction unit and an output of the spurious cancellation unit.

12 Claims, 10 Drawing Sheets

WIRELESS RECEIVING APPARATUS

CROSS-REFERENCE TO RELATED APPLICATION

This application is a continuation application and is based upon PCT/JP2011/065713, filed on Jul. 8, 2011, the entire contents of which are incorporated herein by reference.

FIELD

The embodiments discussed herein are related to a wireless receiving apparatus.

BACKGROUND

Signals (spurious) other than a transmitted signal (desired wave) and the desired wave may mix in reception of communications. The spurious degrades reception quality, and therefore, it is preferred to reduce an influence of the spurious.

Hitherto, a technique utilizing multi-antenna is known as a method for canceling the spurious, and a self-wave cancellation type spurious canceling method is known as one example thereof.

The self-wave cancellation type spurious canceling method modifies desired wave components by a spurious extraction unit which uses an FIR (Finite Impulse Response) filter, so that a desired wave component for a first antenna and a desired wave component for a second antenna include the equal amplitude and include reversed phase to each other, and thereby extracting the spurious.

Further, for example, the method modifies the extracted spurious component by a spurious cancellation unit which uses an FIR filter, so that the extracted spurious component and a spurious component of a combined signal obtained by combining received signals according to diversity technique include the equal amplitude and include a reversed phase to each other, and thereby canceling a spurious component.

At this time, a correlation unit finds a correlation between an output of a spurious extraction unit and a signal for a second antenna, for example. However, since there is a spurious component in the signal for the second antenna, it is difficult to sufficiently cancel a spurious component and to extract only a desired wave component.

As mentioned above, for example, a self-wave cancellation type spurious canceling method cancels a spurious component by a spurious cancellation unit which uses an FIR filter, by using a spurious component extracted with a spurious extraction unit.

At this time, a correlation unit finds a correlation between an output of a spurious extraction unit and a signal for a second antenna, for example. However, since there is a spurious component in the signal for a second antenna, it is difficult to sufficiently cancel a spurious component and to extract only a desired wave component.

In this regard, various types of wireless receiving apparatus have been proposed.

Patent Document 1: Japanese Laid-open Patent Publication No. 2009-212590

SUMMARY

According to an aspect of the embodiments, there is provided a wireless receiving apparatus including a spurious component extraction unit, and a spurious cancellation unit.

The spurious component extraction unit is configured to cancel a desired wave with a multi-antenna configuration, and extract spurious components.

The spurious cancellation unit is configured to cancel spurious in received signals by using the spurious components extracted. A first correlation unit in the spurious component extraction unit finds a correlation between an output of the spurious extraction unit and an output of the spurious cancellation unit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Before describing embodiments of a wireless receiving apparatus in detail, an example of a wireless receiving apparatus and problems to be solved will be described with reference to FIG. 1 to FIG. 3.

Figure 1:
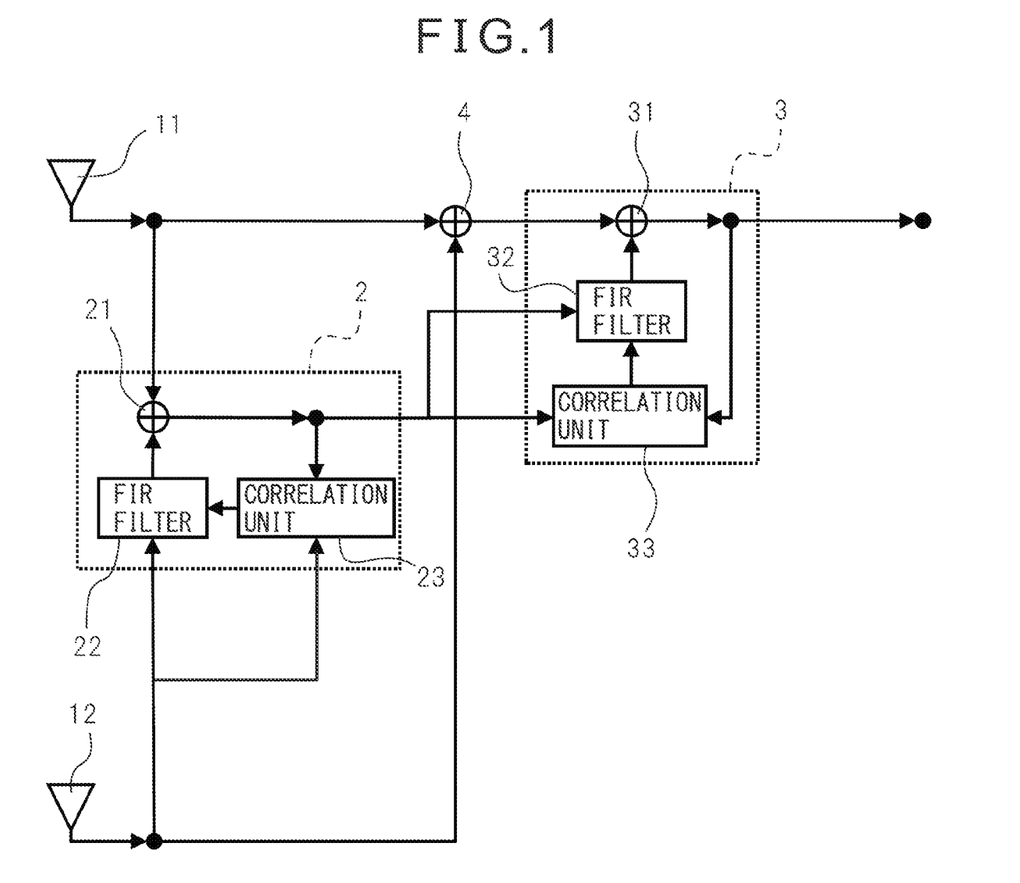
FIG. 1 is a block diagram illustrating an example of a wireless receiving apparatus.

FIG. 1 is a block diagram illustrating an example of the wireless receiving apparatus, and illustrates the wireless receiving apparatus to which the self-wave cancellation type spurious canceling method which cancels spurious with two antennas (multi-antenna) is applied.

In FIG. 1, a reference sign 11 denotes a first antenna, 12 denotes a second antenna, 2 denotes a spurious extraction unit, 3 denotes a spurious cancellation unit, and 4 denotes an adder.

The spurious extraction unit 2 includes an adder 21, an FIR filter 22, and a correlation unit 23, and the spurious cancellation unit 3 includes an adder 31, an FIR filter 32, and a correlation unit 33.

An output (first received signal) of the first antenna 11 is supplied to the adder 4 and the adder 21 in the spurious extraction unit 2. The second received signal of the second antenna 12 is supplied to the adder 4, the FIR filter 22 and the correlation unit 23 in the spurious extraction unit 2.

In the spurious extraction unit 2, an output of the FIR filter 22 is supplied to the adder 21, and is added to (is subtracted from) the first received signal from the first antenna 11. An output of the adder 21 is supplied to the correlation unit 23 of the spurious extraction unit 2, and the FIR filter 32 and the correlation unit 33 of the spurious cancellation unit 3.

In the spurious cancellation unit 3, an output of the FIR filter 32 is supplied to the adder 31, and is added to (is subtracted from) the output of the adder 4. An output of the adder 31 is supplied to the correlation unit 33 of the spurious cancellation unit 3, and is output as a detected signal.

The correlation unit 23 finds a correlation between the second received signal from the second antenna 12 and the output of the spurious extraction unit 2, and the correlation unit 33 finds a correlation between the output of the spurious extraction unit 2 and the output of the spurious cancellation unit 3. The filter property of the FIR filter 22 is controlled by an output of the correlation unit 23, and the filter property of the FIR filter 23 is controlled by an output of the correlation unit 33.

Figure 2A:
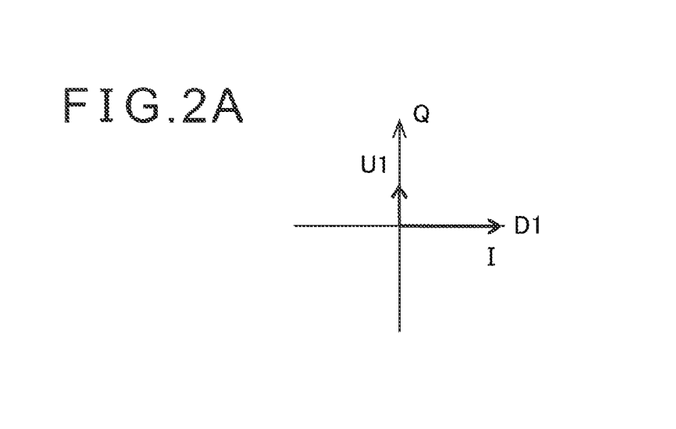
FIG. 2A, FIG. 2B, and FIG. 2C are drawings for describing an example of an operation of the wireless receiving apparatus illustrated in FIG. 1.
Figure 2B:
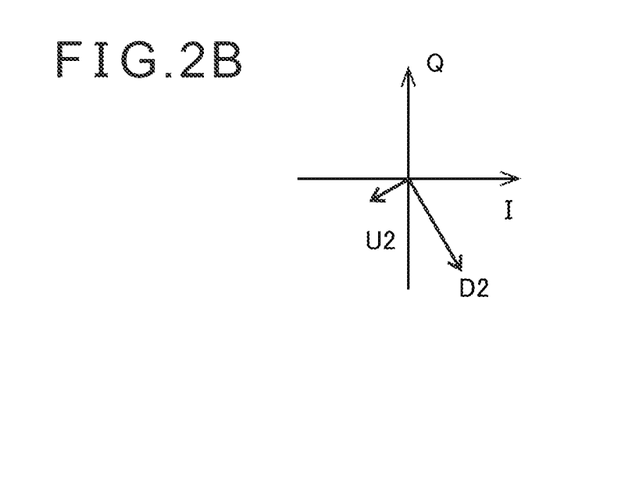

FIG. 2A to FIG. 2C are drawings for describing an example of the operation of the wireless receiving apparatus illustrated in FIG. 1. FIG. 2A illustrates a constellation diagram for the first antenna 11, and FIG. 2B illustrates a constellation diagram for the second antenna 12.

Figure 2C:
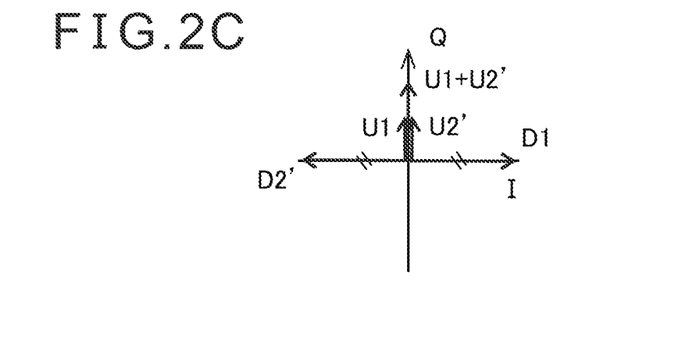

FIG. 2C illustrates a constellation diagram at the time of a diversity combining by the spurious extraction unit 2. In each drawing, an axis of ordinate denotes Q-signal component and an axis of abscissa denotes I-signal component.

In FIG. 2A, a reference sign D1 denotes a desired wave component in the first received signal from the first antenna 11, and U1 denotes a spurious component in the first received signal. Similarly, in FIG. 2B, a reference sign D2 denotes a desired wave component in the second received signal from the second antenna 12, and U2 denotes a spurious component in the second received signal.

As illustrated in FIG. 2C, the spurious extraction unit 2 modifies the second received signal D2+U2 of the second antenna 12 by the FIR filter 22, so that the desired wave component D2 of the second antenna 12 includes the equal amplitude and includes a reversed phase to the desired wave component D1 of the first antenna 11.

The second received signal D2'+U2' which is FIR-filtered with the FIR filter 22 is combined with the first received signal D1+U1 from the first antenna 11 by the adder 21. The desired wave component D1 in the first received signal and the desired wave component D2' in the second received signal which is FIR-filtered include the equal amplitude and include a reversed phase to each other.

Therefore, the output of the spurious extraction unit 2 becomes a combined signal U1+U2' of the spurious component U1 of the first received signal and the spurious component U2' of the second received signal which is FIR-filtered, and only a spurious component is extracted.

The spurious cancellation unit 3 removes the spurious component from the combined signal obtained by combining the outputs of the first antenna 11 and the second antenna 12 according to a diversity technique, by using the spurious component U1+U2' extracted by spurious extraction unit 2 with a similar technique to the spurious extraction unit 2.

In other words, the spurious component U1+U2' extracted by the spurious extraction unit 2 is modified by the FIR filter 32, so that the spurious component U1+U2' includes the equal amplitude and includes the reversed phase to the spurious component of the combined signal obtained by combining the first received signal and the second received signal according to a diversity technique, and the modified signal is combined with the combined signal. In this way, it is possible to cancel the spurious component from the received signal (combined signal), and to extract and output only the desired wave component.

Figure 3A:
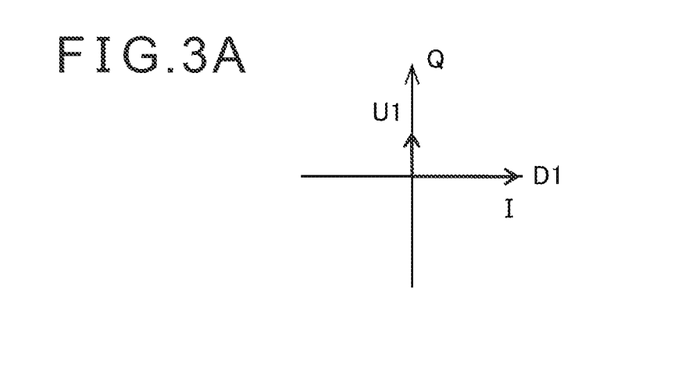
FIG. 3A, FIG. 3B, and FIG. 3C are drawings for describing another example of an operation of the wireless receiving apparatus illustrated in FIG. 1.
Figure 3B:
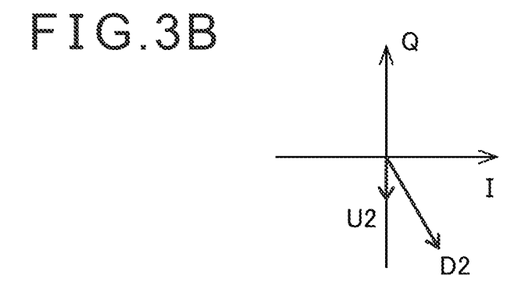
Figure 3C:
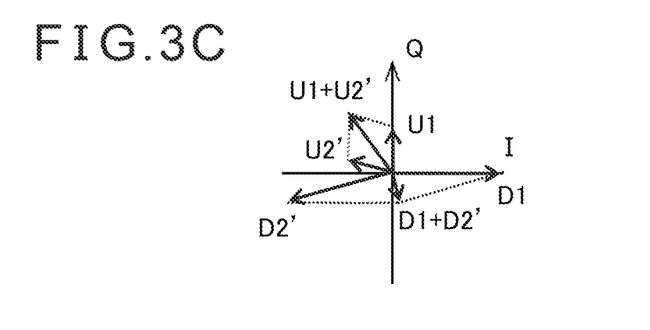

FIG. 3A to FIG. 3C are drawings for describing another example of the operation of the wireless receiving apparatus illustrated in FIG. 1. FIG. 3A illustrates a constellation diagram for the first antenna 11, and FIG. 3B illustrates a constellation diagram for the second antenna 12. FIG. 3C illustrates a constellation diagram at the time of a diversity combining by the spurious extraction unit 2.

In FIG. 3C, a reference sign D2' denotes the desired wave component in the second received signal after being filtered with the FIR filter 22, and U2' denotes the spurious component in the second received signal after being filtered with the FIR filter 22.

In the example illustrated in FIG. 2A to FIG. 2C, a case has been described in which the desired wave component D2 for the second antenna 12 is adjusted with the FIR filter 22 at the time of combining in the spurious extraction unit 2, so that the desired wave component D2 includes the equal amplitude and includes the reversed phase to the desired wave component D1 for the first antenna 11.

In other words, FIG. 2A to FIG. 2C illustrate the case in which the spurious component U1 for the first antenna 11 and the spurious component U2 for the second antenna 12 include the equal phase. However, in an actual environment, the phases of the spurious component U1 for the first antenna 11 and the spurious component U2 for the second antenna 12 are different from each other in most cases, as illustrated in FIG. 3A and FIG. 3B.

Therefore, although the correlation unit 23 finds a correlation between the output of the spurious extraction unit 2 and the second received signal of the second antenna 12, there is a spurious component in the second received signal when the phases of spurious components U1 and U2 are different from each other.

For that reason, the FIR filter 22 causes an unintended modification on the desired wave component D2 in the second received signal of the second antenna 12 such that the desired wave component D2 is slightly shifted from a position in the constellation diagram, which position indicates that the desired wave component D2 includes the equal amplitude and includes the reversed phase to the desired wave component D1 in the first received signal of the first antenna 11.

In other words, as illustrated in FIG. 3C, not only the combined signal U1+U2' of the spurious components but also the combined signal D1+D2' of the desired wave components will remain in the output of the spurious extraction unit 2.

As a result, even if the spurious cancellation unit 3 tries to cancel the spurious by the spurious component with which the desired wave component remains, it is difficult to sufficiently cancel the spurious component and to extract only the desired wave component.

Figure 4:
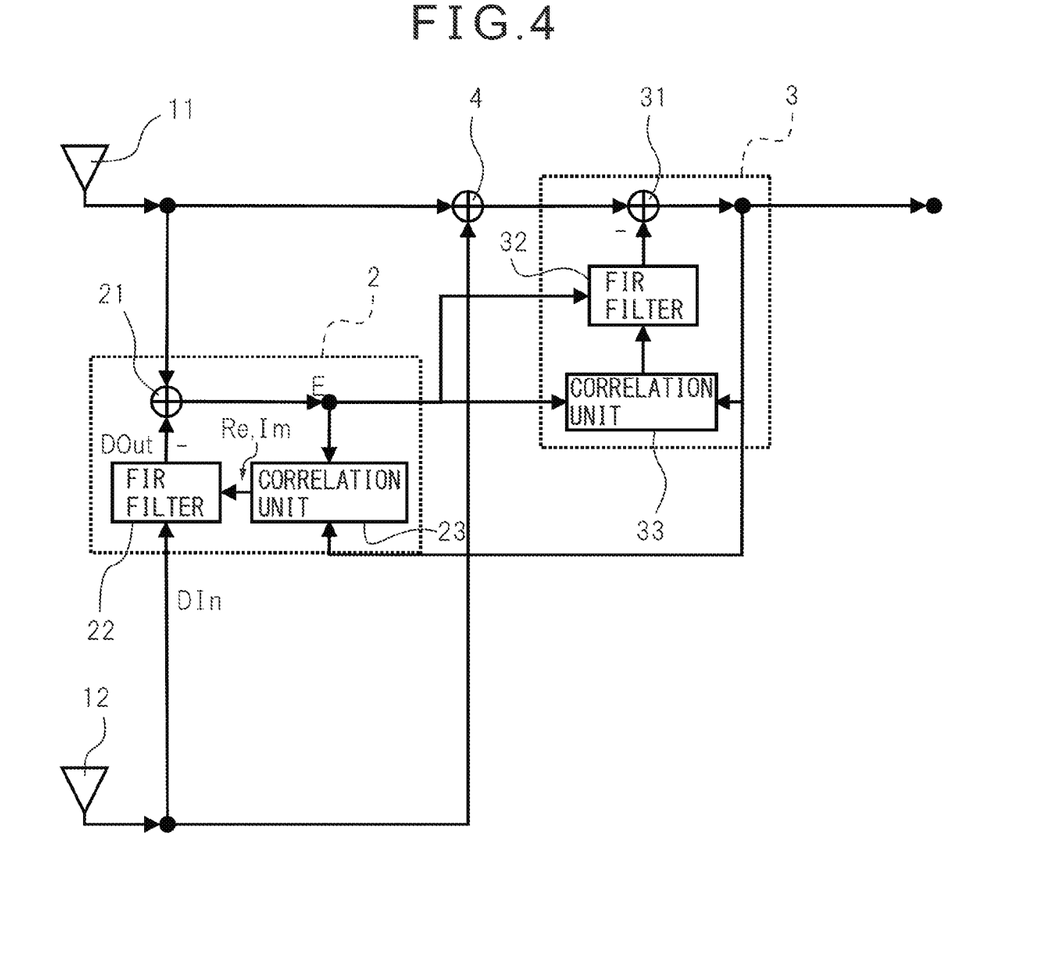
FIG. 4 is a block diagram illustrating a wireless receiving apparatus in a first embodiment.

Hereinafter, the embodiments of a wireless receiving apparatus will be described in detail with reference to accompanying drawings. FIG. 4 is a block diagram illustrating the wireless receiving apparatus of a first embodiment.

In FIG. 4, a reference sign 11 denotes a first antenna, 12 denotes a second antenna, 2 denotes a spurious extraction unit, 3 denotes a spurious cancellation unit, and 4 denotes an adder.

The spurious extraction unit 2 includes an adder 21, an FIR filter (first FIR filter) 22, and a correlation unit (first correlation unit) 23. The spurious extraction unit 3 includes an adder 31, an FIR filter (second FIR filter) 32, and a correlation unit (second correlation unit) 33.

An output (first received signal) of the first antenna 11 is supplied to the adder 4 and the adder 21 in the spurious extraction unit 2. The second received signal (DIn) of the second antenna 12 is supplied to the adder 4, and the FIR filter 22 in the spurious extraction unit 2.

In the spurious extraction unit 2, an output (signal DOut) of the FIR filter 22 is supplied to the adder 21, and is added to (is subtracted from) the first received signal from the first antenna 11. An output (signal E) of the adder 21 is supplied to the correlation unit 23 of the spurious extraction unit 2, and the FIR filter 32 and the correlation unit 33 of the spurious cancellation unit 3.

In the spurious cancellation unit 3, an output of the FIR filter 32 is supplied to the adder 31, and is added to (is subtracted from) the output of the adder 4. An output of the adder 31 is supplied to the correlation unit 33 of the spurious cancellation unit 3 and the correlation unit 23 of the spurious extraction unit 2, and is output as a detected signal.

As is clear from the comparison between above-mentioned FIG. 1 and FIG. 4, according to the wireless receiving apparatus of the first embodiment, the output of the adder 31 of the spurious cancellation unit 3 is supplied to the correlation unit 23 of the spurious extraction unit 2, instead of the second received signal from the second antenna 12.

Therefore, both correlation units 23 and 33 find the correlation between the output of the spurious extraction unit 2 and the output of the spurious cancellation unit 3. The filter property of the FIR filter 22 is controlled by an output of the correlation unit 23, and the filter property of the FIR filter 32 is controlled by an output of the correlation unit 33.

Figure 5A:
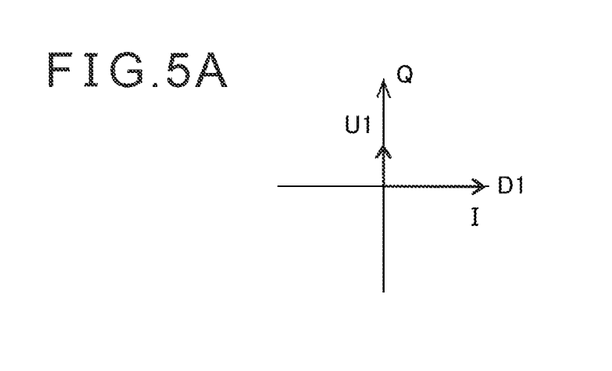
FIG. 5A, FIG. 5B, and FIG. 5C are drawings for describing an operation of the wireless receiving apparatus illustrated in FIG. 4.
Figure 5B:
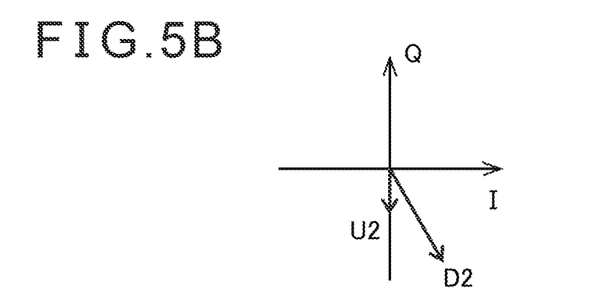

FIG. 5A to FIG. 5C are drawings for describing the operation of the wireless receiving apparatus illustrated in FIG. 4. FIG. 5A illustrates a constellation diagram for the first antenna 11, and FIG. 5B illustrates a constellation diagram for the second antenna 12.

Figure 5C:
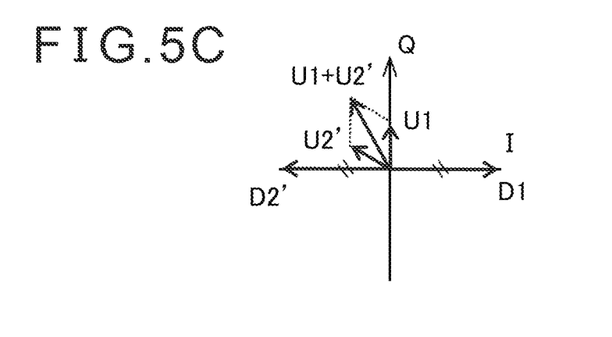

FIG. 5C illustrates a constellation diagram at the time of a diversity combining by the spurious extraction unit 2. FIG. 5A and FIG. 5B correspond to FIG. 3A and FIG. 3B which are mentioned above, respectively. In each drawing, an axis of ordinate denotes Q-signal component and an axis of abscissa denotes I-signal component.

In FIG. 5A, a reference sign D1 denotes the desired wave component in the first received signal from the first antenna 11, and U1 denotes the spurious component in the first received signal. Similarly, in FIG. 5B, a reference sign D2 denotes the desired wave component in the second received signal from the second antenna 12, and U2 denotes the spurious component in the second received signal.

In FIG. 5C, a reference sign D2' denotes the desired wave component in the second received signal after being filtered with the FIR filter 22, and U2' denotes the spurious component in the second received signal after being filtered with the FIR filter 22.

As illustrated in FIG. 4, according to the wireless receiving apparatus of the first embodiment, the correlation unit 23 of the spurious extraction unit 2 is adapted to find the correlation between the output of the spurious extraction unit 2 and the output of the spurious cancellation unit 3. Since the output of the spurious cancellation unit 3 is a signal after canceling the spurious, there is no spurious component therein.

In this way, as illustrated in FIG. 5C, the FIR filter 22 of the spurious extraction unit 2 may modify the desired wave component D2 for the second antenna 12 to be in a position in the constellation diagram, which position indicates that the desired wave component D2 includes the equal amplitude and includes the reversed phase to the desired wave component D1 for the first antenna 11.

As a result, the output of the spurious extraction unit 2 may include only the combined signal U1+U2' of the spurious components, and the combined signal D1+D2' of the desired wave components does not remain in the output. Further, it is possible to cancel the spurious more sufficiently by a spurious cancellation unit 3 in a subsequent stage.

Figure 6:
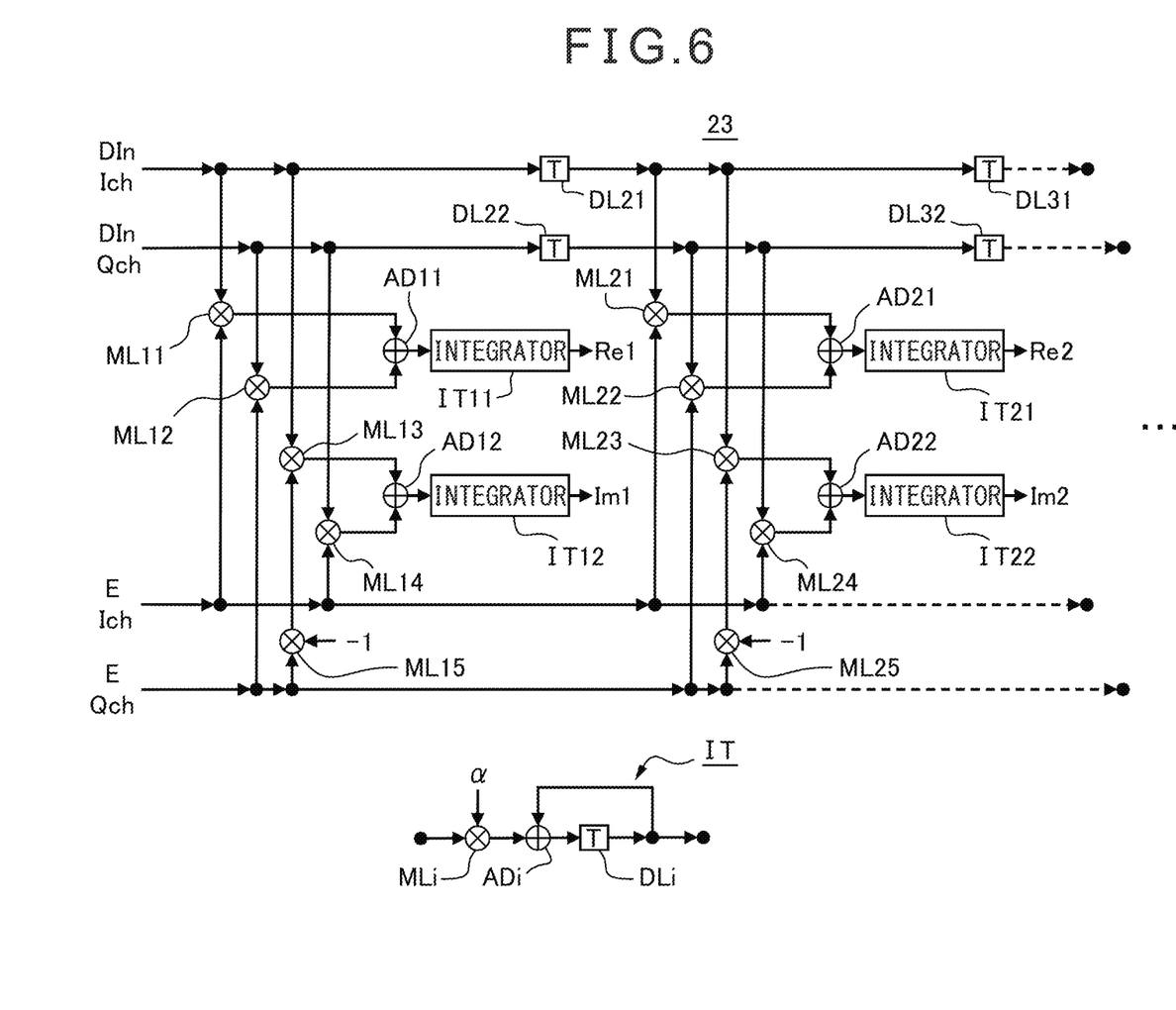
FIG. 6 is a block diagram illustrating an example of a correlation unit in the wireless receiving apparatus illustrated in FIG. 4.

FIG. 6 is a block diagram illustrating an example of the correlation unit 23 in the wireless receiving apparatus illustrated in FIG. 4. As illustrated in FIG. 6, the correlation unit 23 includes a plurality of stages which include substantially the same structures, outputs tap coefficients Re (Re1, Re2 . . . ) and Im (Im1, Im2 . . . ) as an output of each stage for controlling the FIR filter 22.

First, a circuit in a first stage which generates the tap coefficients Re1 and Im1 includes a plurality of multipliers ML11 to ML15, adders AD11 and AD12, and integrators IT11 and IT12. The circuit in the first stage receives and processes the second received signal DIn (DIn Ich, DIn Qch) from the second antenna 12, and the output signal E (E Ich, E Qch) of the adder 21.

In other words, the multiplier ML11 multiplies an I-channel signal (I-signal component) DIn Ich of the second received signal and an I-channel signal E Ich of the output of the adder 21, and outputs the result to the adder AD11.

The multiplier ML12 multiplies a Q-channel signal (Q-signal component) DIn Qch of the second received signal, and a Q-channel signal E Qch of the output of the adder 21, and outputs the result to the adder AD11. Then, the adder AD11 adds supplied outputs from the multipliers ML11 and ML12, and outputs the result to the integrator IT11.

On the other hand, the multiplier ML 13 multiplies the I-channel signal DIn Ich of the second received signal and the Q-channel signal E Qch of the output of the adder 21, the sign of which is inverted by the multiplier ML 15, and outputs the result to the adder AD12.

The multiplier ML14 multiplies the Q-channel signal DIn Qch of the second received signal and the I-channel signal E Ich of the output of the adder 21, and outputs the result to the adder AD12. Then, the adder AD12 adds supplied outputs from the multipliers ML13 and ML14, and outputs the result to the integrator IT12.

Next, a circuit in the second stage which generates tap coefficients Re2 and Im2 includes substantially the same structure as the circuit in the first stage, and includes a plurality of multipliers ML21 to ML25, adders AD21 and AD22, and integrators IT21 and IT22. The circuit in the second stage does not receive respective channels of the second received signal DIn Ich and DIn Qch directly, but receives the channels of signal through delay elements DL21 and DL22 each of which includes time delay T. Note that, channels of the output signal E Ich and E Qch of the adder 21 are directly received as is the case with the circuit in the first stage.

Further, although not illustrated, a circuit in the third stage which generates tap coefficients Re3 and Im3 also includes substantially the same structure as the circuits in the first and second stages. The channels of the second received signal DIn Ich and DIn Qch are received through sets of two delay elements DL21 and DL31, and DL22 and DL32, respectively. Note that, respective channels of the output signal E Ich and E Qch of the adder 21 are directly received as is the case with the circuits in the first and second stages.

In the above structure, the integrator IT (IT11, IT12, IT21 and IT22) in the circuit in each stage includes a multiplier MLi for multiplying time constant α, a delay element DLi, and an adder ADi adding an output of the multiplier MLi and an output of the delay element DLi. Note that the delay element DLi is arranged at the output of the adder ADi, and delays the output of the adder ADi to supply the result to the multiplier ADi. The time constant α is a value smaller than 1.

In this way, the correlation unit 23 finds, with the multipliers ML11 to ML15, ML21 to ML25 . . . , and the adders AD11, AD12, AD21, AD22 . . . , correlations between channels of the second received signal (or the delayed signal thereof) DIn Ich and DIn Qch from the second antenna 12 and channels of the output signal E Ich and E Qch of the adder 21.

Further, the correlation unit 23 averages, with the integrators IT11, IT12, IT21 and IT22 . . . , the correlations to generate tap coefficients Re1 Re2 . . . , and Im1, Im2 . . . for the FIR filter 22.

Figure 7:
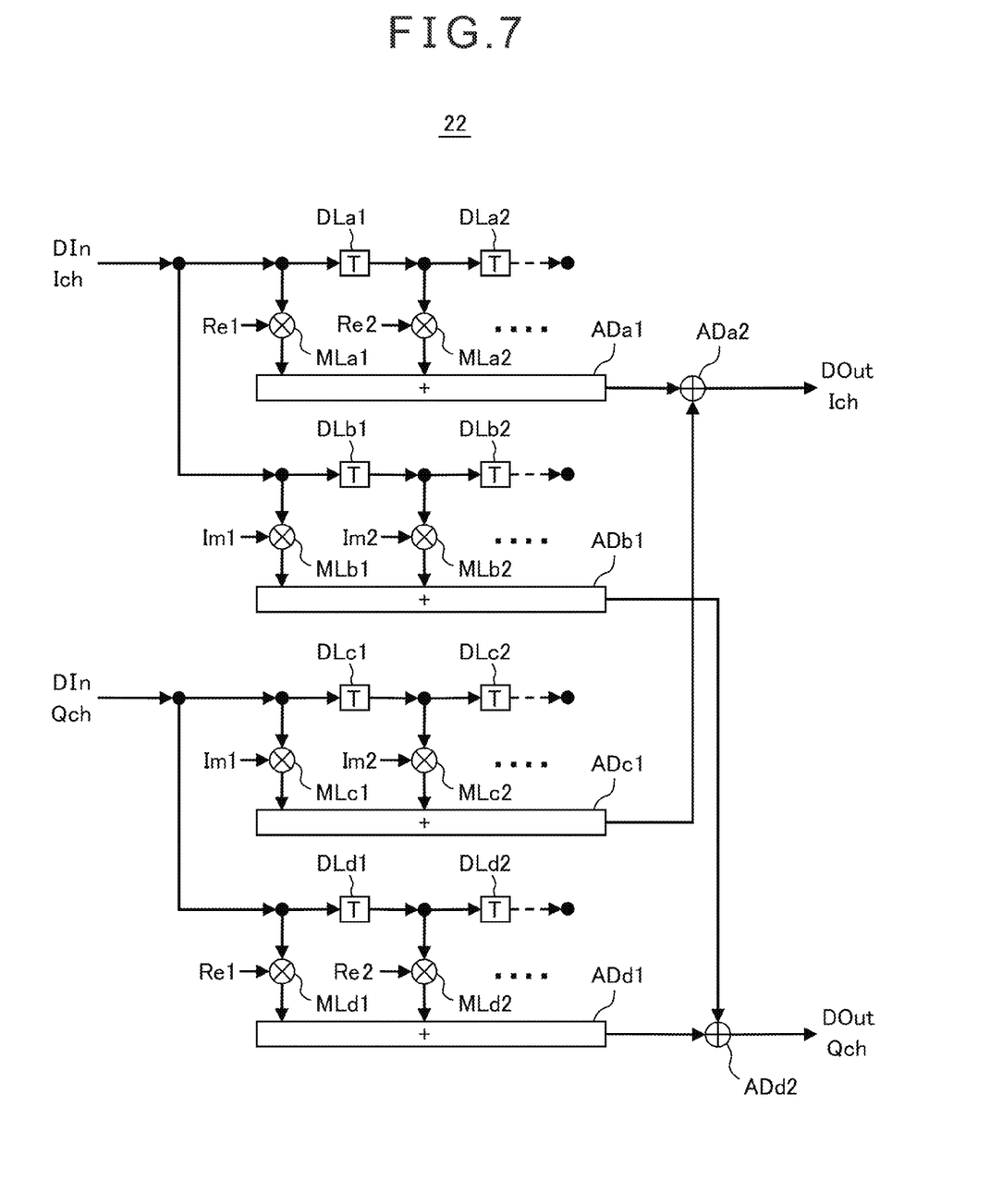
FIG. 7 is a block diagram illustrating an example of an FIR filter in the wireless receiving apparatus illustrated in FIG. 4.

FIG. 7 is a block diagram illustrating an example of the FIR filter 22 in the wireless receiving apparatus illustrated in FIG. 4. As illustrated in FIG. 7, respective tap coefficients Re1, Re2 . . . , and Im1, Im2 . . . generated by the correlation unit 23 described with reference to FIG. 6, are provided to multipliers MLa1, MLa2 . . . , MLd1, MLd2 . . . , MLb1, MLb2 . . . , MLc1 and MLc2 in the FIR filter 22, as time constants.

In other words, the I-channel signal DIn Ich of the second received signal is multiplied by the tap coefficient (time constant) Re1 with the multiplier MLa1, and the result is output to the adder ADa1. The signal DIn Ich delayed by a delay element DLa1 is multiplied by the tap coefficient Re2 with the multiplier MLa2, and the result is output to the adder ADa1.

Further, for example, the signal DIn Ich delayed by delay elements DLa1 and DLa2 is multiplied by the tap coefficient Re3 with the multiplier MLa3 in subsequent stage (not illustrated), and the result is output to the adder ADa1. The outputs obtained by respective multipliers MLa1, MLa2 . . . in this way are all added by the adder ADa1, and the result is output to an adder ADa2.

The I-channel signal DIn Ich of the second received signal is multiplied by the tap coefficient Im1 with the multiplier MLb1, and the result is output to the adder ADb1. The signal DIn Ich delayed by a delay element DLb1 is multiplied by the tap coefficient Im2 with the multiplier MLb2, and the result is output to the adder ADb1.

Further, for example, the signal DIn Ich delayed by delay elements DLb1 and DLb2 is multiplied by the tap coefficient Im3 with the multiplier MLb3 in subsequent stage (not illustrated), and the result is output to the adder ADb1. The outputs obtained by respective multipliers MLb1, MLb2 . . . in this way are added by the adder ADb1, and the result is output to an adder ADa2.

On the other hand, the Q-channel signal DIn Qch of the second received signal is multiplied by the tap coefficient Im1 with the multiplier MLc1, and the result is output to an adder ADc1. The signal DIn Qch delayed by a delay element DLc1 is multiplied by the tap coefficient Im2 with the multiplier MLc2, and the result is output to the adder ADc1.

Further, for example, the signal DIn Qch delayed by delay elements DLc1 and DLc2 is multiplied by the tap coefficient Im3 with the multiplier MLc3 in subsequent stage (not illustrated), and the result is output to the adder ADc1. The outputs obtained by respective multipliers MLc1, MLc2 . . . in this way are added by the adder ADc1, and the result is output to the adder ADa2. The output result is added to the output of the adder ADa1 mentioned above to generate an output DOut Ich.

The Q-channel signal DIn Qch of the second received signal is multiplied by the tap coefficient Re1 with the multiplier MLd1, and the result is output to an adder ADd1. The signal DIn Qch delayed by a delay element DLd1 is multiplied by the tap coefficient Re2 with the multiplier MLd2, and the result is output to the adder ADd1.

Further, for example, the signal DIn Qch delayed by delay elements DLd1 and DLd2 is multiplied by the tap coefficient Re3 with the multiplier MLd3 in subsequent stage (not illustrated), and the result is output to the adder ADd1. The outputs obtained by respective multipliers MLd1, MLd2 . . . in this way are added by the adder ADd1, and the result is output to the adder ADa2. The output result is added to the output of the adder ADb1 mentioned above to generate an output DOut Qch.

In the above, the correlation units illustrated in FIG. 6 and the FIR filters illustrated in FIG. 7 are mere examples, and it is needless to say that correlation units and FIR filters having other various structures are applicable.

Figure 8:
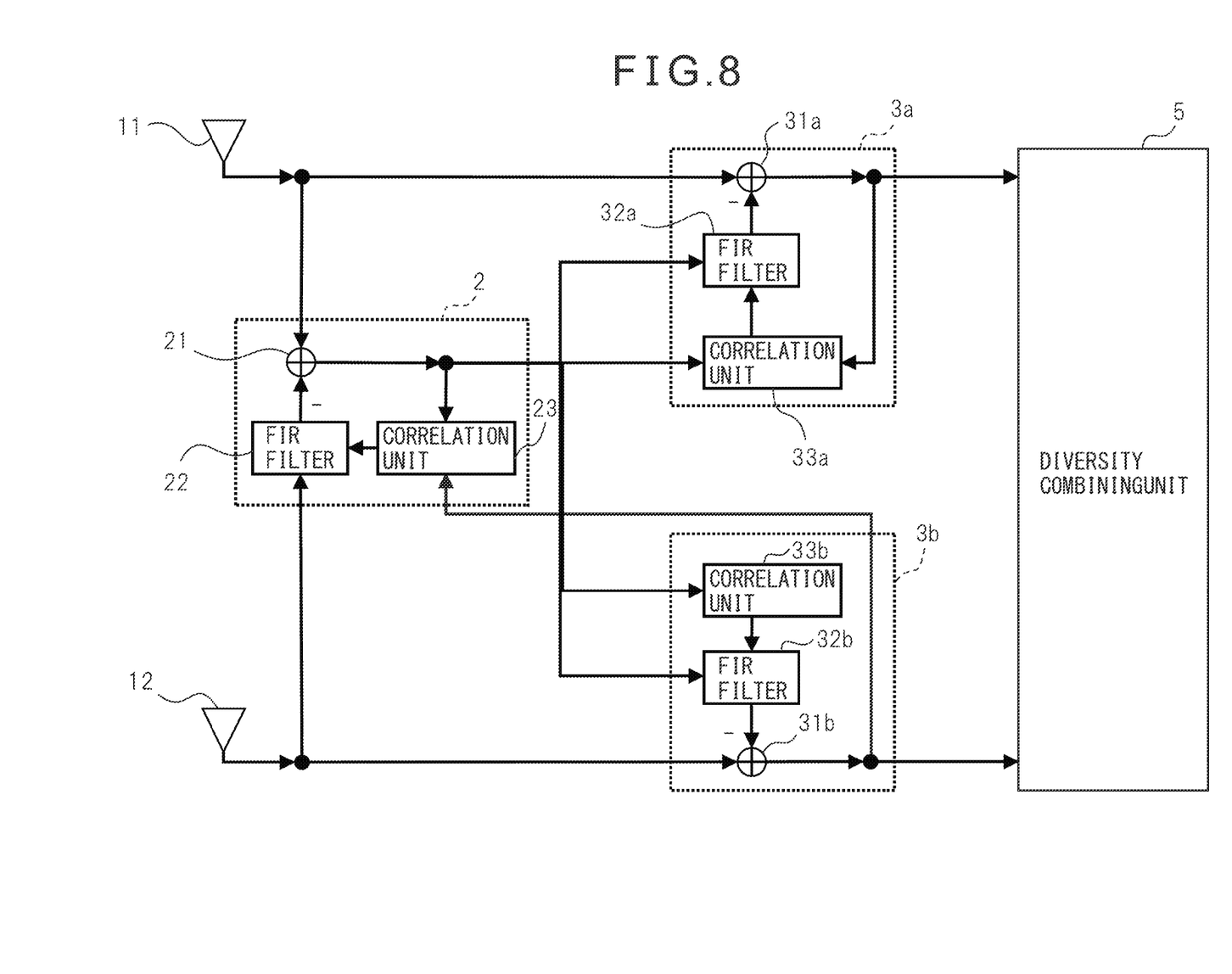
FIG. 8 is a block diagram illustrating a wireless receiving apparatus in a second embodiment.

FIG. 8 is a block diagram illustrating a wireless receiving apparatus of a second embodiment. As illustrated in FIG. 8, according to the wireless receiving apparatus of the second embodiment, spurious cancellation units 3a and 3b are provided so as to process the first and second signals from the first and second antennas 11 and 12, respectively.

In the spurious cancellation units 3a and 3b, FIR filters (second FIR filters) 32a and 32b correspond to the FIR filter 32 in FIG. 4, and correlation units (second correlation units) 33a and 33b correspond to the correlation unit 33 in FIG. 4. In addition, adders 31a and 31b correspond to the adder 31 in FIG. 4.

In other words, according to the wireless receiving apparatus of the first embodiment illustrated in FIG. 6 mentioned above, the adder 4 adds the first and second received signals, and the spurious cancellation unit 3 is provided in the subsequent stage to cancel the spurious.

On the other hand, the wireless receiving apparatus according to the second embodiment, the spurious in the first received signal from the first antenna 11 is canceled by the spurious cancellation unit 3a, and the spurious in the second received signal from the second antenna 12 is canceled by the spurious cancellation unit 3b.

Further, in the wireless receiving apparatus according to the second embodiment, a diversity combining unit 5 which receives the outputs of the spurious cancellation units 3a and 3b is adapted to combine the first and second received signals after the spurious cancellation according to a diversity technique.

In this way, when a known signal (pilot signal) is included in a transmission signal, for example, the known signal is extracted from the signal with an improved reception quality after spurious cancellation, and a much more precise diversity combining may be performed due to the known signal.

Figure 9:
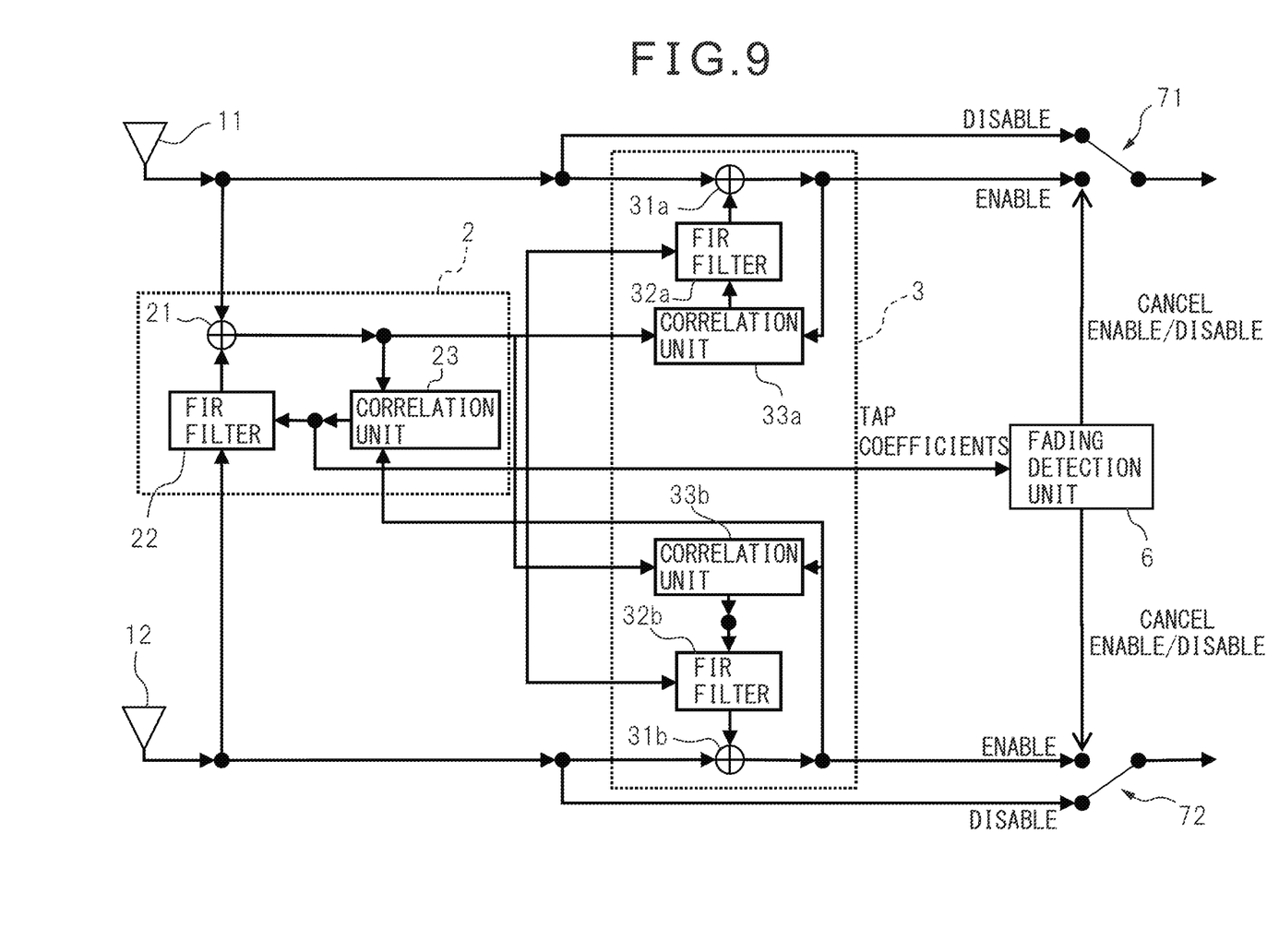
FIG. 9 is a block diagram illustrating a wireless receiving apparatus in a third embodiment.

FIG. 9 is a block diagram illustrating a wireless receiving apparatus of a third embodiment. As illustrated in FIG. 9, the wireless receiving apparatus of the third embodiment is provided with a fading detection unit 6 and switches 71 and 72 controlled by an output of the fading detection unit 6.

By the way, according to the wireless receiving apparatus of the first and second embodiments mentioned above, it may be necessary to calculate the average for a certain length of time (time period) in the integrators (IT11, IT12, IT21, IT22) of the correlation unit 23, for example.

However, when fading occurs, for example, a phase relation between the received signals for the antennas, i.e. a phase relation between the first received signal from the first antenna 11 and the second received signal from the second antenna 12, varies.

Therefore, when the phase relation between the first and second received signals varies, the calculation in the correlation unit 23 may be difficult to follow such variation of the fading. In that case, it becomes difficult to extract the spurious, and as a result, and there is a possibility that the reception quality is degraded, compared with a case when the spurious is not canceled.

Therefore, in the wireless receiving apparatus of the third embodiment, a time variation (variance) of the tap coefficients which are outputs of the correlation unit 23 in the spurious extraction unit 2 is monitored by the fading detection unit 6. In other words, when there is no fading, there is no time variation in the tap coefficients and a variance value thereof is small. When a fading occurs, there is a time variation in the tap coefficients and the variance value thereof becomes larger.

The fading detection unit 6 detects whether or not the variance value is greater than a preset threshold, and the spurious cancellation is not performed (the switches 71 and 72 are connected to disabling side) when the variance value is greater than the threshold. Thereby, a degradation of reception quality is prevented.

On the other hand, when the variance value is smaller than the threshold, the spurious cancellation is performed (the switches 71 and 72 are connected to enabling side) to improve the reception quality.

In FIG. 9, the structure of the spurious cancellation unit 3 (3a, 3b) is depicted corresponding to the second embodiment, but it is needless to say that the preset invention is not limited to such a structure.

Figure 10:
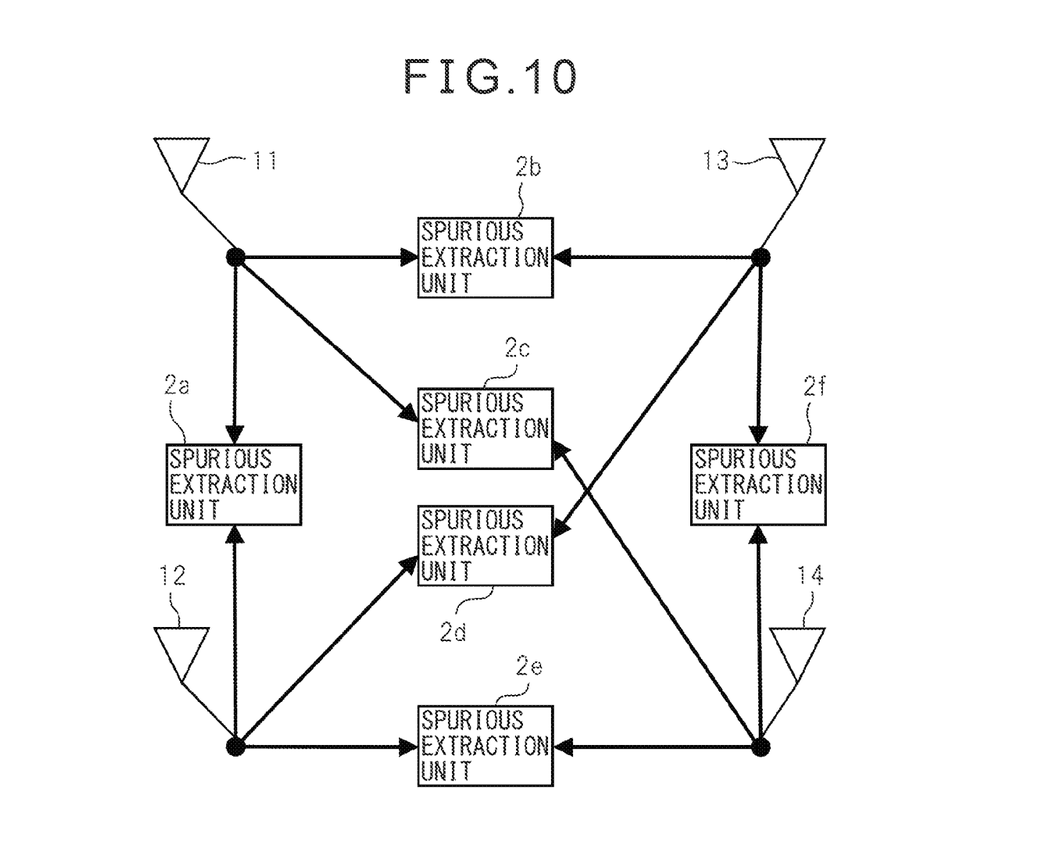
FIG. 10 is a block diagram illustrating a wireless receiving apparatus in a fourth embodiment.

FIG. 10 is a block diagram illustrating a wireless receiving apparatus of a fourth embodiment. Although the above-mentioned first to third embodiments describe a case which includes two antennas of first and second antennas 11 and 12, the present fourth embodiment describes an example which includes four antennas of first to fourth antennas 11 to 14. In other words, the present embodiment is also applicable to a structure with a multi-antenna having three or more antennas.

In FIG. 10, spurious extraction units 2a to 2f are provided for each two arbitrary antennas in a structure with four antennas 11 to 14, and optimal two antennas are selected in accordance with the receiving conditions to be used as the first and second antennas 11 and 12.

When the number of antennas is N (when it is N antenna structure), the spurious extraction may be performed between two antennas among N antennas, and the number of the spurious extraction units may be calculated by $_NC_2$ (C: combination).

In other words, in a structure with only two antennas, when adjusting the desired wave component for the second antenna 12 with the FIR filter 22 so that the component includes the equal amplitude and includes the reversed phase to the desired wave component for the first antenna 11, an accuracy of the spurious extraction may decrease.

Specifically, when the spurious component for the first antenna 11 and the spurious component for the second antenna 12 include almost the equal amplitude and are almost in-phase, for example, spurious components cancel out each other and the accuracy of the spurious extraction will decrease.

For that reason, three or more antennas are provided, outputs of two or more spurious extraction units are monitored, and a spurious extraction unit, of which power or amplitude is stably large, is selected to use for the spurious cancellation. In this way, providing three or more antennas allows a cancellation of the spurious while avoiding a decrease of the accuracy of the spurious extraction.

According to each embodiment, it is possible to cancel a spurious in a received signal and to improve reception quality. In addition, it is possible to prevent a degradation of reception quality due to the spurious cancellation at the time of fading occurrence, and a degradation of an accuracy of spurious extraction under a specific receiving condition.

Figure 11:
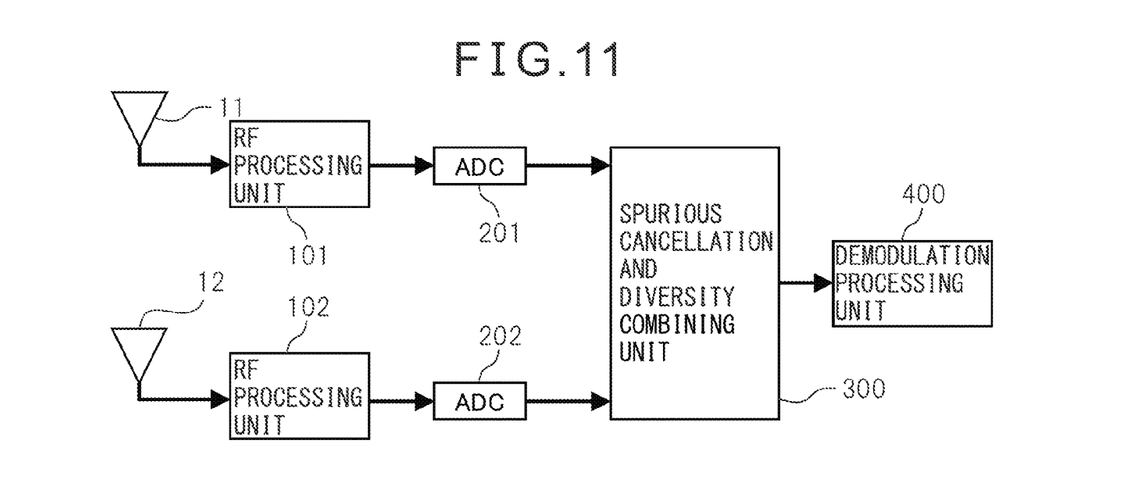
FIG. 11 is a block diagram illustrating an overall structure of an example of a radio receiving system to which a wireless receiving apparatus of the present embodiments is applied.

FIG. 11 is a block diagram illustrating an overall structure of an example of a radio receiving system to which the wireless receiving apparatus of the present embodiments is applied. As illustrated in FIG. 11, the signal received by the first antenna 11 is processed according to radio frequency processing (RF processing) by an RF processing unit 101, and is converted into a digital signal by an analog-to-digital converter (A/D converter, ADC) 201.

Similarly, the signal received by the second antenna 12 is processed according to RF processing by an RF processing unit 102, and is converted into a digital signal by an ADC 202.

To the output signals (first and second received signals) of the ADCs 201 and 202, the spurious cancellation and a diversity combining between the first and second antennas are performed by a spurious cancellation and a diversity combining unit 300.

An output of the spurious cancellation and the diversity combining unit 300 is supplied to a demodulation processing unit 400, and demodulation processing corresponding to a modulation scheme on the transmitting side is performed.

Note that the spurious cancellation and the diversity combining unit 300 is implemented by a semiconductor integrated circuit. In this case, for example, the circuit may be made as a dedicated semiconductor integrated circuit (chip), but may include other circuit structure. As a semiconductor integrated circuit, LSI (Large Scale Integration), FPGA (Field Programmable Gate Array) or the like may be adapted.

Specifically, it is possible to configure a single LSI or FPGA so that the demodulation processing unit 400 and/or the ADCs 201 and 202 are added to the spurious cancellation and the diversity combining unit 300, for example.

In addition, it is also possible to configure an LSI or an FPGA which includes the RF processing units 101 and 102, the ADCs 201 and 202, the spurious cancellation and the diversity combining unit 300, and the demodulation processing unit 400 altogether.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. A wireless receiving apparatus comprising:
a spurious component extraction unit configured to cancel a desired wave with a multi-antenna configuration, and extract spurious components;
a spurious cancellation unit configured to cancel spurious in received signals by using the spurious components extracted; and
a diversity combining unit configured to combine the received signals of respective antennas according to a diversity technique, wherein
a first correlation unit in the spurious component extraction unit finds a correlation between an output of the spurious extraction unit and an output of the spurious cancellation unit, the diversity combining unit is provided in subsequent stage of the spurious cancellation unit, and the spurious cancellation unit cancels the spurious in the received signals of respective antennas by using the spurious components extracted, and after that, the diversity combining unit combines signals according to the diversity technique.

2. The wireless receiving apparatus according to claim 1, wherein the multi-antenna configuration includes two antennas.

3. The wireless receiving apparatus according to claim 2, wherein the spurious component extraction unit and the spurious cancellation unit perform radio frequency processing on the received signals by the two antennas, and receive signals after an analog-to-digital conversion.

4. A wireless receiving apparatus comprising:

a spurious component extraction unit configured to cancel a desired wave with a multi-antenna configuration, and extract spurious components;

a spurious cancellation unit configured to cancel spurious in received signals by using the spurious components extracted, wherein a first correlation unit in the spurious component extraction unit finds a correlation between an output of the spurious extraction unit and an output of the spurious cancellation unit, the spurious component extraction unit includes a first FIR filter controlled by tap coefficients from the first correlation unit, and the spurious cancellation unit includes a second correlation unit and a second FIR filter controlled by tap coefficients from the second correlation unit.

5. The wireless receiving apparatus according to claim 4, the wireless receiving apparatus further comprising:

a fading detection unit configured to detect occurrence of a fading in the received signals, wherein when the occurrence of the fading is detected by the fading detection unit, the cancellation of the spurious in the received signals is stopped.

6. The wireless receiving apparatus according to claim 5, the wireless receiving apparatus further comprising:

a switch configured to switch between outputting the received signals of a multi-antenna directly and outputting the received signals through the spurious cancellation unit, according to an output of the phasing occurrence detection unit.

7. The wireless receiving apparatus according to claim 5, wherein the fading detection unit detects the occurrence of the fading in the received signals by using the tap coefficients for the first FIR filter.

8. A wireless receiving apparatus comprising:

a spurious component extraction unit configured to cancel a desired wave with a multi-antenna configuration, and extract spurious components;

a spurious cancellation unit configured to cancel spurious in received signals by using the spurious components extracted, wherein a first correlation unit in the spurious component extraction unit finds a correlation between an output of the spurious extraction unit and an output of the spurious cancellation unit, and the multi-antenna configuration includes three or more antennas, and the received signals by two antennas of which power or amplitude is stably large are selected to be used.

9. The wireless receiving apparatus according to claim 8, wherein the spurious component extraction unit and the spurious cancellation unit perform radio frequency processing on the received signals by the two antennas, and receive signals after an analog-to-digital conversion.

10. A semiconductor integrated circuit comprising:

a wireless receiving apparatus, the wireless receiving apparatus including:

a spurious component extraction unit configured to cancel a desired wave with a multi-antenna configuration, and extract spurious components; and a spurious cancellation unit configured to cancel spurious in received signals by using the spurious components extracted, wherein a first correlation unit in the spurious component extraction unit finds a correlation between an output of the spurious extraction unit and an output of the spurious cancellation unit, the multi-antenna configuration includes three or more antennas, and the received signals by two antennas of which power or amplitude is stably large are selected to be used, and the spurious component extraction unit and the spurious cancellation unit perform radio frequency processing on the received signals by the two antennas, and receive signals after an analog-to-digital conversion;

a radio frequency processing unit configured to perform radio frequency processing on the received signals by the two antennas; and an analog-to-digital converter configured to perform the analog-to-digital conversion on the received signals to which the radio frequency processing is applied.

11. The semiconductor integrated circuit according to claim 10, the semiconductor integrated circuit further comprising:

a demodulation processing unit configured to perform demodulation processing on output signal from the wireless receiving apparatus.

12. The semiconductor integrated circuit according to claim 10, wherein the semiconductor integrated circuit is configured as single LSI or FPGA.

* * * * *